United States Patent [19]
Lubin et al.

[11] Patent Number: 5,614,078
[45] Date of Patent: Mar. 25, 1997

[54] METHOD AND APPARATUS FOR REMOVING NITRATES FROM WATER

[75] Inventors: Mark Lubin; Sjef Otten, both of Miami, Fla.

[73] Assignee: Upscale Technologies, Inc., Miami, Fla.

[21] Appl. No.: 671,264

[22] Filed: Jun. 26, 1996

Related U.S. Application Data

[63] Continuation-in-part of Ser. No. 457,040, Jun. 1, 1995, abandoned.

[51] Int. Cl.$^6$ ................................................... C02F 1/461
[52] U.S. Cl. ......................... 205/743; 205/744; 205/760; 204/231; 204/228; 204/275
[58] Field of Search .................................. 205/743, 744, 205/760; 204/231, 275, 228

[56] References Cited

U.S. PATENT DOCUMENTS

| | | | |
|---|---|---|---|
| 3,542,657 | 11/1970 | Mindler et al. | 204/98 |
| 4,046,663 | 9/1977 | Fleet et al. | 204/280 |
| 4,056,482 | 11/1977 | Schmieder et al. | 204/149 |
| 4,257,352 | 3/1981 | Habegger | 119/5 |
| 5,306,400 | 4/1994 | Bradbury et al. | 204/101 |
| 5,376,240 | 12/1994 | Kaczur et al. | 204/128 |

*Primary Examiner*—Arun S. Phasge
*Attorney, Agent, or Firm*—David P. Gordon

[57] ABSTRACT

An apparatus for reducing nitrates in an aqueous solution includes an electrochemical cell having a container for containing the aqueous solution containing nitrates, a carbon fiber cathodic electrode, a carbon fiber anodic electrode, and a reference electrode immersed in the aqueous solution, and an electronic control circuit which impresses a voltage across the electrodes causing electrochemical reduction/oxidation reactions on the surfaces of the electrodes. The electrodes are at a potential such that nitrates are reduced to gaseous products, and further such that hydrogen, oxygen, chlorine, an other noxious substances are not produced. The cell may be a flow cell or a holding tank and apparatus of different size and capacity are disclosed. The apparatus is useful in reducing nitrates in any water system and is particularly useful in reducing nitrates in aquatic systems without harming aquatic life. One of the methods of the invention includes sequentially impressing three voltage signals between the reference electrode and the cathodic electrode, wherein each of the voltage signals are of different magnitudes, the voltage signals being a constant time-out period voltage, a sweep voltage and a constant working voltage.

23 Claims, 7 Drawing Sheets

METHOD AND APPARATUS FOR REMOVING NITRATES FROM WATER

This application is a continuation-in-part of U.S. Ser. No. 08/457,040, filed on Jun. 1, 1995, the complete disclosure of which is hereby incorporated by reference now abandoned.

BACKGROUND OF THE INVENTION

1. Field of the Invention

This invention relates generally to a device for removing nitrates from water, and this invention specifically relates to a device for removing nitrates from aquatic systems to reduce the toxicity of the water in such systems to living organisms.

2. State of the Art

Nitrate contamination is a serious problem in many aquatic systems. The primary source of dissolved nitrates is in run-off water containing nitrogenous animal waste (urine, feces, uneaten food, decayed tissues, etc.) from poultry, dairy cattle, hogs, and aquacultured species. The second largest source of nitrate contaminated water is the processing water used to clean and prepare poultry and meat food products. This water is heavily loaded with nitrates and it is typically stored for use in crop irrigation. The water is used as a crop irrigant only to the extent that the crops absorb nitrates. That it, the run-off irrigation water will still contain nitrates. Thus, the third most prominent source of nitrate contaminated water is run-off water from nitrate fertilized crop fields.

Nitrate contamination is a serious problem because nitrates are poisonous to human and animal life. Nitrogenous waste generally occurs as three highly soluble species: ammonia, nitrite, and nitrate. Ammonia is the most toxic of the three. Nitrites are known to be carcinogens and nitrates are toxic at somewhat higher levels of concentration. However, nitrates consumed by humans and animals are converted into the more toxic nitrites during digestion. Naturally occurring bacteria help to alleviate part of the problem of nitrogenous waste contamination by converting ammonia into nitrites and nitrites into nitrates. These aerobic nitrifying bacteria oxidize ammonia to nitrite, and nitrite to nitrate, respectively, as part of their metabolic and respiratory processes. Under the right conditions, i.e. anaerobic and in the presence of food molecules, nitrates become a source of oxygen to anaerobic bacteria and the nitrates are converted to Nitrogen gas.

In open aquatic systems, such as in oceans and seas, the sheer volume of water and the preponderance of nitrifying bacteria typically maintains the concentration of nitrogenous waste at safe levels. In smaller open aquatic systems which are vulnerable to land based pollution, such as lakes and aquifers which are near farms, the ecology of the aquatic system may be insufficient to maintain a low level of nitrates. In closed aquatic systems, such aquaculture ponds and aquaria, active steps must be taken to maintain safe levels of nitrogenous waste, or to avoid contamination of the water. For example, in farming areas, it is common to monitor the levels of nitrates in sources of drinking water and to avoid drinking contaminated water when the levels are too high. Pregnant women and children are often advised to drink only bottled water. The U.S. Environmental Protection Agency has set the maximum acceptable level of nitrates in drinking water at 10 ppm. Nitrates in drinking water are recognized to be the single largest causative mechanism of digestive tract cancers in humans and farm animals as well as the cause of "blue baby syndrome" in heavy agricultural regions.

Still another source of nitrate pollution exists in areas where septic tanks and water wells coexist in close proximity. This situation is quite common in New England where older septic tanks commonly leak nitrogenous waste into well aquifers rendering the water undrinkable.

The most common problem in closed aquatic systems, however, lies in aquaculture. Contaminated fishing waters pose serious economic and health problems today when demand for food fish is very high. So-called "wild" fishing waters can be contaminated by nearby or upstream sources of nitrogen, such as crop or poultry farming operations which allow nitrogenous waste to run off into a river. This has been a documented problem in the waters of the Neuse River in North Carolina, for example. There, upstream hog farming operations introduced nitrogenous waste into the river which eventually raised the level of nitrates in the downstream fishing region. The toxicity of the nitrates caused the fish to become biologically stressed and more susceptible to disease. People who consumed the diseased fish became extremely ill, and consequently, the local fisheries suffered significant economic loss. Other nitrogen polluted areas include the Everglades south of Lake Okeechobee, Fla. where the sugar industry has been a major contributor to ecological upsets. In South Florida, the most practical solution to date has been to plant nitrogen consuming crops in the affected areas, but this method is very slow acting and requires large planted tracts.

Nitrogen pollution of fishing waters has become so common, that commercial food fisheries have turned their efforts to pond aquaculture or fish farms where the conditions of the water can be more tightly controlled. However, even in these "aquarium" environments, nitrogenous waste can be a serious problem due to a high density of aquatic livestock. As used herein, the term "aquarium" refers to both relatively large fish farms containing many millions of gallons of water as well as relatively small pet fish aquaria containing thousands, hundreds, or even several gallons of water.

All multi-cellular animal life-forms in aquarium environments give off nitrogenous waste in the form of ammonia as a direct result of physiological, respiratory and metabolic activity. Most marine organisms, especially soft-bodied invertebrates such as corals that are typically found in aquarium environments, have a very low tolerance for ammonia and nitrite, and only a slightly better tolerance for nitrate. In aquaria, ammonia and nitrite reach toxic levels at approximately 0.25 parts per million (ppm), which is a level much higher than that found naturally in sea water. The level of nitrates in sea water is approximately 2–5 ppm. In the open ocean, nitrate levels are controlled by dilution and by anaerobic bacteria which consume nitrates as an oxygen source for metabolism. In closed marine systems, nitrates accumulate until their concentration is reduced by periodic water changes or by pockets of an anaerobic bacterial system. Water changes of fifteen percent every two weeks are typical. One must change the water regularly to keep the marine life alive. This necessity can be extremely expensive inland, where natural sea water is not available and purified water must be mixed with artificial sea salts. Moreover, in the case of aquaculture ponds, each pond must be completely drained at least once per year so that nitrate muck can be scraped up from the bottom of the pond. A typical commercial pond is five to ten acres, about ten feet deep, and contains approximately fifteen to thirty million gallons of water. The nitrate muck removed from these ponds is considered to be toxic waste by some regulatory agencies and disposal is a severe problem.

It is known to take advantage of bacterial anaerobic metabolic capability in order to reduce nitrate levels in aquaria. Water is pumped from the aquarium into a holding tank where a filter pad is populated with chemoautotrophic bacteria. Methanol and other nutrients are introduced into the holding tank to drive the bacteria into anaerobic metabolism and to provide a source of carbohydrates (methanol being the simplest carbohydrate). While the water is slowly circulated for several hours, the bacteria use the nitrate ions as an oxygen source to consume the carbohydrates as food. At a programmed time the water in the tank is pumped back into the aquarium and a new batch of water to be treated is obtained. Those skilled in the art will recognize that methanol is poisonous and must be used carefully in this system, lest the aquarium water be contaminated with unconsumed methanol. For this reason and other economic considerations (e.g. the cost of the methanol and the nutrients), this system is impractical for the treatment of drinking water or commercial fish pond water.

Electrolysis is presently known to be used in certain systems for the removal of certain undesirable and/or toxic substances from water. Electrolysis involves electrochemical reactions requiring at least two electrodes, usually metallic, an anode and a cathode. In general, corrosion is a very common problem when metals come in contact with water, particularly with salt water, and is particularly a problem while current flows through the electrodes. Marine life cannot tolerate abnormally high levels of metallic ions or corrosion products, particularly in a closed system. Most electrode materials currently available are not suitable for nitrate reduction in marine aquarium applications for several reasons: (1) most non-noble metals, such as copper, corrode in sea water; (2) many electrode materials, such as copper, mercury and lead, are poisonous to marine life; (3) since most noble metals are excellent catalysts for the hydrogen ion reduction reaction, the hydrogen evolution reaction will proceed at a reaction rate many times larger than the nitrate reduction reaction rate, causing the pH of the sea water to increase beyond acceptable limits for marine life survival; (4) the electrode materials result in chlorine generation which, even in extremely low concentrations, is highly toxic to marine life. The only way to prevent chlorine generation is to decrease the anodic current density by greatly increasing the anode to cathode surface area ratio, which would also result in a device of immense size. In addition, the bulk processing of nitrate in any water system requires a large electrode surface area which would result in a device of immense size.

Devices exist which use electrolysis to remove toxic substances from aqueous systems. Such devices are disclosed in U.S. Pat. No. 4,956,057 to Stucki et al., (the U.S. Pat. No. '057 patent), U.S. Pat. No. 4,212,724 to Moeglich (the U.S. Pat. No. '724 patent), U.S. Pat. No. 5,148,772 to Kirschbaum (the U.S. Pat. No. '772 patent), U.S. Pat. No. 4,257,352 to Habegger (the U.S. Pat. No. '352 patent), U.S. Pat. No. 3,891,535 to Wikey (the U.S. Pat. No. '535 patent), U.S. Pat. No. 3,542,657 to Mindler (the U.S. Pat. No. '657 patent), and in U.S. Pat. No. 4,056,482 to Schmeider (the U.S. Pat. No. '482 patent), all incorporated herein by reference. While these devices use electrolysis to a certain degree of effectiveness, some of the above-mentioned problems are inherent in them, as described below.

The U.S. Pat. No. '057 patent describes a process for removal of nitrites and nitrates from an aqueous solution by means of electrolysis. The aqueous solution is fed to a separate cathode space of the electrochemical cell. Gas formed by the electrolytic reduction, containing $H_2$, $NH_3$, NO and $N_2O$ is passed through a catalyst bed producing $N_2$ and $H_2O$. The formation of $NH_3$ and $H_2$, indicates very high current densities, which would also cause the formation of $Cl_2$ gas from salt water, and is thus not suitable for salt water applications. As mentioned above, $NH_3$ is poisonous to aquatic life. The formation of $H_2$ results in a change of pH, which, if more than slight, cannot be tolerated by aquatic life.

The U.S. Pat. No. 4,212,724 patent discloses an oxidation and coagulation method and apparatus suitable for use with aquariums which includes a plurality of electrodes disposed in a chamber connected to a source of e.m.f. (A.C.) and a plurality of electrically conductive particles. The electrodes are preferably mounted by opposite side walls of the chamber so that they extend horizontally, substantially parallel to each other. Oxidation of nitrogenous waste does not remove dissolved nitrates, as nitrates can only be removed by reduction processes.

The U.S. Pat. No. 3,891,535 patent describes an aquarium water treatment apparatus utilizing two or more plates spaced apart and insulated from each other. A power source is provided for oppositely polarizing juxtaposed plates. A low voltage field is periodically reversed to prevent any buildup of impurities on the plates. Released gases, such as oxygen, may be carried to the bottom of the bodies of water to enhance the aerating effect and the sterilization of the water.

Both the U.S. Pat. No. 4,212,724 and U.S. Pat. No. 3,891,535 patents disclose the formation of large amounts of hydrogen, oxygen and chlorine, which are toxic to aquatic life and corrosive to stainless steel and other metal electrodes.

The U.S. Pat. No. '772 patent describes a method and apparatus for electrically inhibiting bacteria growth in aquariums including electrodes connected to a D.C. power source.

The U.S. Pat. No. '352 patent discloses a protozoan marine life inhibitor for use with an aquarium which includes a pair of carbon rod electrodes connected to an A.C. power source and positioned in a stream of water to terminate the protozoan life forms in the water passing between the electrodes. The U.S. Pat. No. '352 patent reveals that the exact electrical and physiological phenomena are not fully understood, but that the protozoan life forms undergo life altering experiences.

Neither the U.S. Pat. No. '772 patent nor the U.S. Pat. No. '352 patent address the issue of nitrate reduction. Further, the '772 system uses galvanized wire electrodes, which can be poisonous to marine life.

The U.S. Pat. No. '657 patent demonstrates the viability of reducing nitrates using certain metal electrodes (copper, lead, tin, iron, silver, cadmium, platinum, cobalt, nickel, and alloys thereof) which he found to be good electro-catalysts for nitrate reduction. This process has several disadvantages including heat generation, and the requirement of relatively high current densities and voltages. These disadvantages together with the unsuitability of metal electrodes make this process unsuitable for potable water treatment or aquatic life support systems. While the U.S. Pat. No. '482 patent proposes a system of nitrate reduction using graphite electrodes, the reaction requires the addition of cations such as copper, lead, or titanium in order to compensate for the poor electro-catalytic behavior of graphite. In actual practice, the graphite shown in the U.S. Pat. No. '482 patent is merely a substrate on which copper, lead, or titanium plates out and the "electrode" actually becomes copper, lead, or titanium.

As mentioned above, these metals are unacceptable for use in aquatic systems.

SUMMARY OF THE INVENTION

It is therefore an object of the invention to provide a system which reduces nitrates in aquatic systems without changing the pH appreciably.

It is also an object of the invention to provide a system which reduces nitrates in aquatic systems without the formation of substances which are toxic to aquatic life.

Yet another object of the invention is to provide a system which reduces nitrates in marine and other aqueous systems which uses electrodes which are not poisonous to aquatic life.

Still another object of the invention is to provide a system which reduces nitrates in marine and other aqueous systems which uses electrodes which will not corrode in such systems.

It is another object of the invention to provide a system which reduces nitrates in marine and other aqueous systems without the need for extremely large flow cells.

It is yet another object of the invention to provide a system which reduces nitrates in water and which may be used in both large and small aquatic systems It is also an object of the invention to provide a system which reduces nitrates in water in a manner which is environmentally safe.

It is another object of the invention to provide a nitrate reduction system which is economical.

It is still another object of the invention to provide a system which reduces nitrates in water which can be used in batch processing as well as in flow through processing.

In accord with these objects which will be discussed in detail below, the apparatus of the present invention generally includes an electrochemical flow cell through which the aqueous solution containing nitrates flows or a holding tank cell into which the solution is introduced and then released after processing, and an electrode system including a carbon fiber cathodic electrode, a carbon fiber anodic electrode and a reference electrode. All of the electrodes are immersed in the aqueous solution and coupled to an electronic control circuit which impresses a voltage across the electrodes such that the voltage causes electrochemical reduction/oxidation reactions on the surfaces of the cathodic and anodic electrodes. According to the method of the invention, the electrodes are at a potential wherein nitrates are reduced to gaseous products but hydrogen, oxygen, chlorine, and other noxious substances are not produced. According to the presently preferred embodiment of the invention, the reference electrode is a silver/silver chloride electrode. The flow cell or holding tank is preferably made of an inert material which is non-reactive and non-conductive. In smaller systems inert plastic such as molded polyvinyl chloride, acetylene butylene styrene, polymethyl methacrylate or polycarbonate are preferred materials. In larger systems various fiberglass, resins or concrete are suitable materials. According to a further preferred embodiment, the cathodic and anodic electrodes are carbon fibers based on polyacrylonitrile (PAN). The surface area ratio of the anodic electrode to the cathodic electrode is preferably in the range of 40:1 to 120:1. A presently preferred method of energizing the electrodes includes interrupting the working voltage with a brief time-out voltage which is substantially less than the working voltage and following the time-out voltage with a brief sweep voltage which varies according to a wave function.

In still another aspect of the preferred embodiment, the surfaces of the cathodic and/or anodic electrodes are either chemically or electrochemically modified. With treated cathodic and/or anodic electrodes, the anodic electrode to cathodic electrode surface area ratio is in the range of 5:1 to 15:1.

An exemplary embodiment of a relatively small scale system is disclosed in which the flow rate of the aqueous solution through a flow cell is in the range of 50 to 250 gallons per hour. Other embodiments of the invention include holding tanks with circulation loops and large tanks having baffles and multiple serial sets of electrodes. The larger systems according to the invention process aqueous solution at the rate of 1000 to 1500 gallons per minute.

The system of the invention preferably uses PAN carbon fiber electrodes which are not poisonous to aquatic life, do not corrode, and do not release toxic corrosion products into the water. The use of a silver/silver chloride reference electrode requires less set-up and calibration and is thus easier to use. The extremely high surface area to volume ratio of the material used for cathodic and anodic electrodes allows appreciable bulk nitrate reduction in a reasonably sized flow cell. The voltage pattern and magnitudes of voltage applied to the electrodes maximize the life and usefulness of the electrodes while preventing the production of toxic substances such as chlorine.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
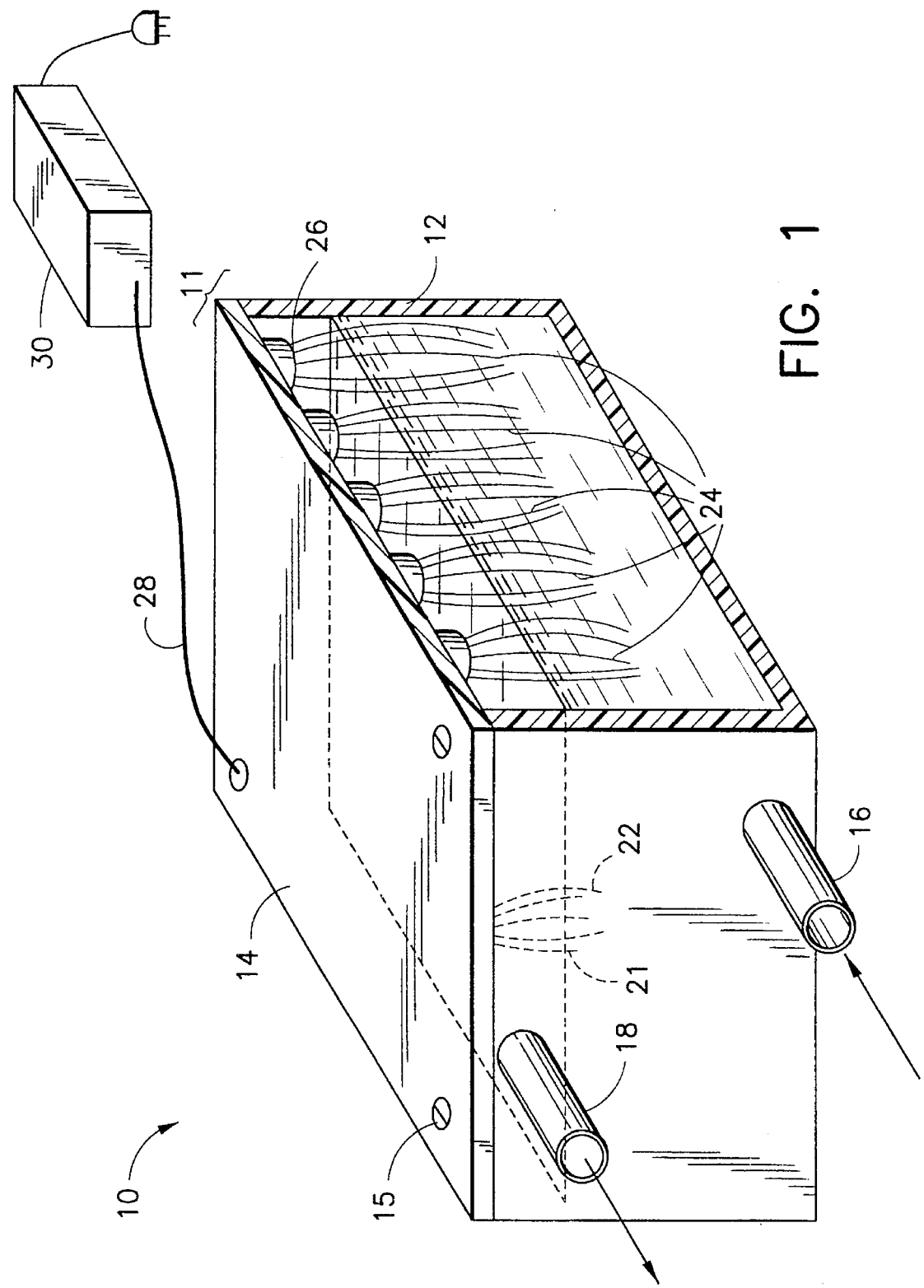
FIG. 1 is a perspective view of an exemplary embodiment of a nitrate reducing apparatus according to the invention.
Figure 2:
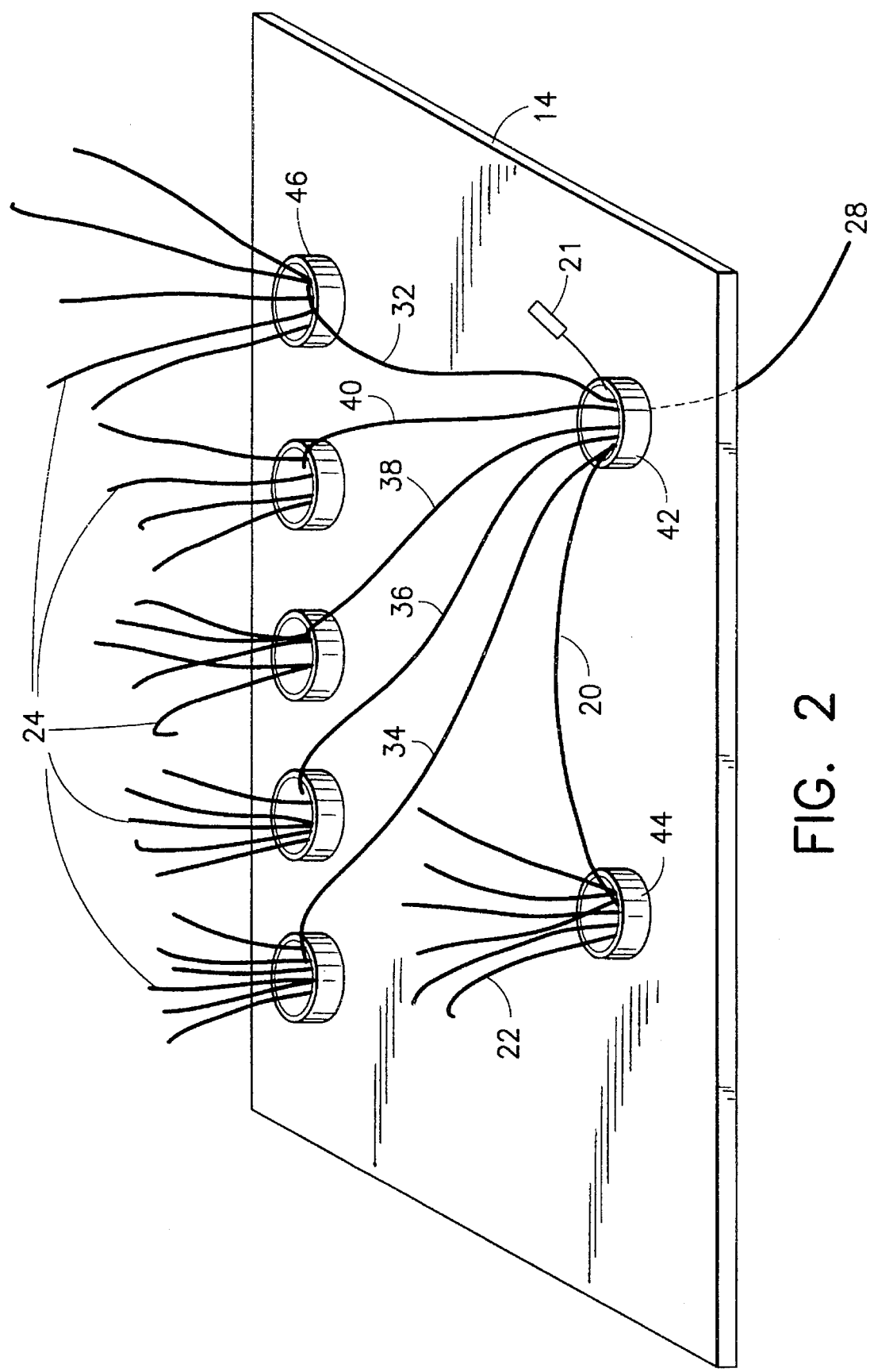
FIG. 2 is an upside down perspective view of the lid and electrode system of the embodiment of FIG. 1.

Referring initially to FIGS. 1 and 2 of the drawings, in which like numerals indicate like elements throughout the several views, an exemplary embodiment the nitrate reducing apparatus of this invention is generally illustrated by reference numeral 10. The nitrate reducing apparatus 10 includes a flow cell 11 which includes a container 12 and a lid 14, both preferably molded of polystyrene. The lid 14 is bolted to container 12 by screws 15. The nitrate reducing apparatus 10 further includes a solution inlet 16 through the side of container 12 and a solution outlet 18 which is spaced apart from the solution inlet 16. A reference electrode 21, a cathodic electrode or cathode 22, and an anodic electrode or anode 24, are immersed in an aqueous solution in the container 12 and coupled to a voltage source as described below when nitrate reducing apparatus 10 is operational.

The anode 24 preferably includes a plurality of anodic electrode portions arranged in parallel, so as to provide maximum anodic to cathodic surface area. The cathode 22 and anode 24 are carbon fiber electrodes, and are preferably based on polyacrylonitrile (PAN) although they may also be carbon fibers based on petroleum derivatives and/or phenolic resins. To achieve significant nitrate reduction rates, the surface area of cathode 22 must be large. Carbon fiber densities ranging from 3k to 320k fibers per tow are commercially available, although the exemplary embodiment employs a 12k carbon fiber. In the exemplary embodiment, the surface area of cathode 22 is 10 square feet. Given the large surface area to volume ratio of the carbon fibers, the total volume occupied by cathode 22 is only approximately 0.125 inches (diameter)×3.5 inches (length) using the 12k carbon fiber. To prevent a chlorine evolution reaction from taking place at anode 24, the anode to cathode surface area ratio has to be large, which means low anodic current density for anode 24. In the preferred embodiments, this ratio is approximately 80:1. The surfaces of cathode 22 and anode 24 may be chemically or electrochemically modified by known processes. While most of the known processes relate to non-fiber carbon electrodes, these treatments may also be applied to carbon fiber electrodes. Depending on the characteristics of cathode 22 and anode 24 and the type of surface treatment used, the surface area ratio is preferably in the range of 5:1 to 15:1.

The reference electrode 21 is preferably a silver/silver chloride reference electrode.

The three electrodes of the nitrate reducing apparatus 10 are connected to an electronic control circuit 30 via a three conductor cable 28. The electronic control circuit 30 controls the voltage pattern and magnitudes applied to the electrodes, which will be more fully described below.

As seen in FIG. 2, all electrical connections within the flow cell 11 are preferably encapsulated in non-toxic epoxy or similar non-toxic material contained in thin plastic shells (42, 44, 46) attached to the lid 14. The several sections of anodic electrode 24 are connected in parallel by wires (32, 34, 36, 38, 40) to one of the conductors of cable 28 at a potting shell 42. The cathodic electrode 22 is connected to the second conductor of cable 28 by wire 20 at the potting shell 42. The reference electrode 21 is connected directly to the third conductor of cable 28. Those skilled in the art will appreciate that the electrodes may be mounted and electrically coupled to the power source in other ways which assure proper electrical insulation and prevent copper conductors from coming in contact with the aqueous solution. For example, by using titanium conductors between the electrodes and copper power conductors, potting can be avoided.

Figure 3:
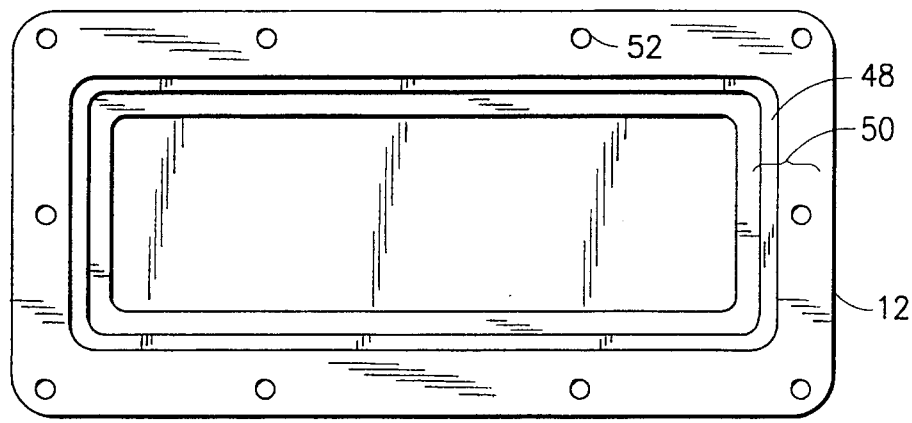
FIG. 3 is a top view of the container portion of the flow cell of the embodiment of FIG. 1.
Figure 4:
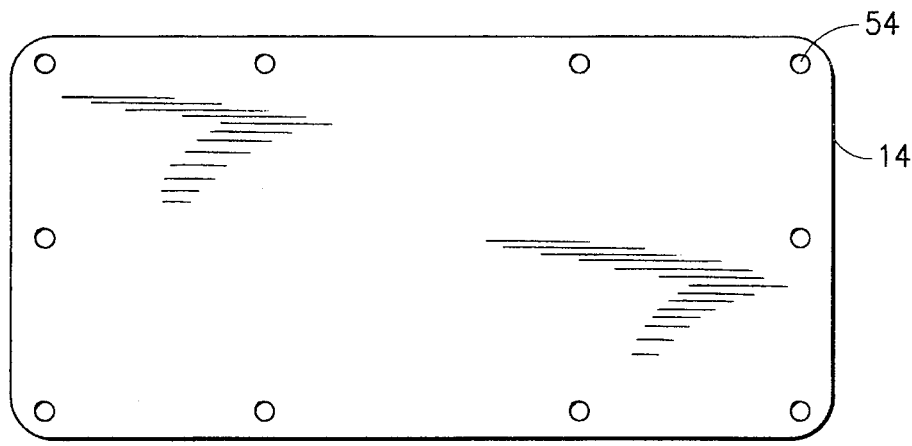
FIG. 4 is a top view of the lid portion of the flow cell of the embodiment of FIG. 1.
Figure 5:
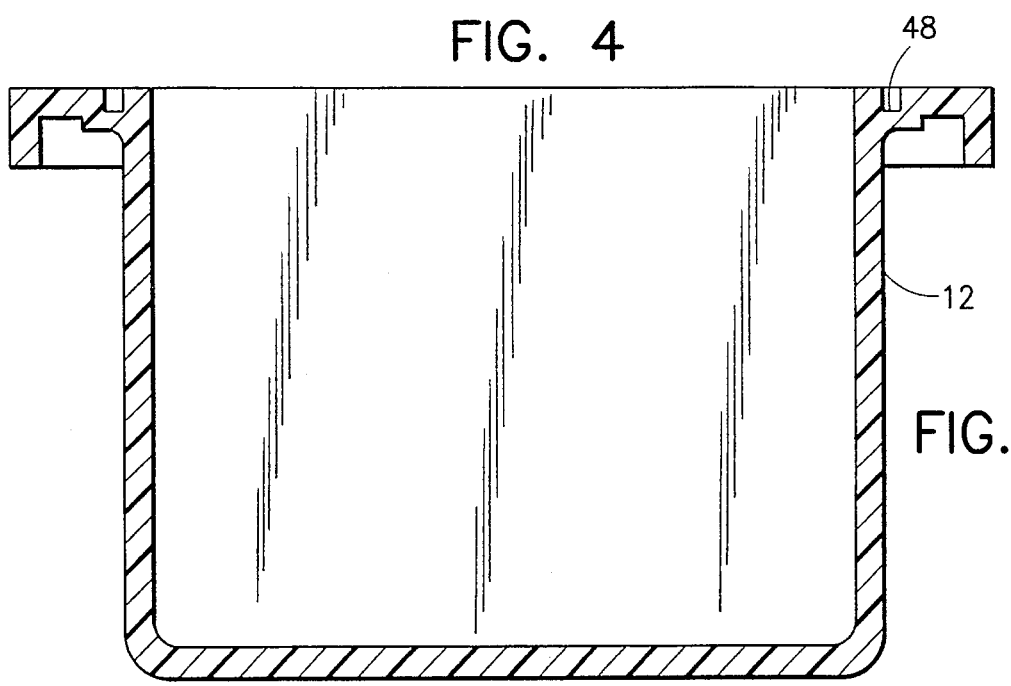
FIG. 5 is a side sectional view of the container portion of the embodiment of FIG. 1.

Referring now to FIGS. 3–5, a top view of the container 12 and the lid 14, respectively, are shown. The container 12 preferably includes a flange 50 and an integral o-ring groove 48. An o-ring or gasket (not shown) of a suitable compressible material is used in the o-ring groove 48 or flat upon the flange surface to form the seal between lid 14 and container 12. In a preferred exemplary embodiment, the container 12 has the following dimensions: 10.4 inches (length)×8.4 inches (width)×7.0 inches (height). However, it will be understood that nitrate reducing apparatus 10 may be of various dimensions depending on the application and as described below with reference to FIGS. 8–12. The container 12 also has holes 52 through which lid 14 is bolted. The lid 14 has holes 54 which are equal in number to holes 52 of container 12, for bolting lid 14 to container 12 and the lid 14 has the same dimensions as flange 50.

In the exemplary embodiment described above, water flows through flow cell 11 at a flow rate preferably in the range of 50 to 250 gallons per hour. While the nitrate reducing apparatus 10 usually requires the lid 14, it is not always necessary to have lid 14. For instance, it is possible to have the electrodes suspended from a bar and immersed in the aqueous solution. The necessity of lid 14 depends on the placement of nitrate reducing apparatus 10 relative to the sump, the sizes of solution inlet 16 and solution outlet 18, and the required flow rate. In the exemplary embodiment, the lid 14 is generally required, because the flow cell 11 is generally placed at the same level as the sump, and the sizes of solution inlet 16 and solution outlet 18 are comparatively small in relation to the desired flow rate of the aqueous solution for achieving maximum nitrate reduction.

In moderate to large aquariums, water flows from the aquarium (not shown) to a sump (not shown). From the sump, water may be pumped through filtration or chemical treatment chambers, ultraviolet sterilizers, chillers, etc., (not shown) depending on the aquarist's particular system. Most of these devices are low pressure systems, so that water is pumped in under pressure, yet it flows out passively in an unrestricted manner, usually back to the sump. In these systems, the nitrate reducing apparatus 10 is advantageously placed so that aqueous solutions flow through the flow cell 11 before returning to the sump.

In operation, a method is provided whereby nitrates are reduced to non-toxic gaseous products such as $N_2O_4$, in an aqueous solution via an electrochemical reduction reaction which occurs at the cathode. In order for current to flow in the aqueous solution, a potential must be established between the electrodes. Electrochemical reduction/oxidation ("redox") reactions occur on electrode surfaces at specific electrode potentials. For a given reaction at a given electrode potential, different electrode materials with the same surface area will transfer different quantities of current, i.e. the current density will vary. Thus, the catalytic properties of the materials are different for specific reactions, and therefore reaction rates will vary per unit electrode surface area. To achieve a given reaction rate per unit surface area, the required electrode potential is a function of the electrode material. Good catalysts require a lower electrode potential (less energy) than poor catalysts. Carbon fibers, and especially PAN carbon fibers have been discovered to be very good electro-catalysts for nitrate reduction and at a low potential. In addition, carbon fibers demonstrate poor electro-catalytic behavior for hydrogen, oxygen, and chlorine reactions. The low potential required for nitrate reduction with carbon fibers also helps to prevent any hydrogen, oxygen, and chlorine reactions.

Electrochemical nitrate reduction takes place at the cathode 22. The anodic and cathodic currents are of the same absolute magnitude, so that the number and nature of anodic reactions depends on, among other things, the electrolyte solution (its composition, concentrations of electrolytes, pH, etc.), the electrode material and the current density through anode 24. PAN based carbon fiber electrodes are preferably used in the nitrate reducing apparatus 10 because, with this type of material, nitrate may be reduced at a lower electrode potential than that required for the hydrogen evolution reaction, so that hydrogen is not produced and the pH of the solution does not change appreciably.

According to the methods of the invention, a direct current or constant working voltage is impressed between the reference electrode 21 and the cathode 22 by the electronic control circuit 30 through cable 28. Nitrate reduction takes place at this working voltage. Periodically this working voltage is replaced for a length of time by a "time-out" period voltage. The time-out period voltage is a low constant level electrode potential at which no nitrate reduction takes place. Its purpose is to serve as a deterrent for the anodic potential to drift into the chlorine evolution range. The time-out period voltage is followed by a sweep voltage, which is a waveform whose upper and lower limits fall above and below the constant working voltage. The waveform may be a triangular, square, sawtooth, or other known sweep waveforms. The periodic sweep voltage serves to clean and resensitize the electrode surfaces. According to the invention, the above signal sequence continues unabated for as long as power is available. No adjustments are necessary, as the process is self-limiting in that current only flows related to the nitrate concentration. Preferably, all voltages used with nitrate reducing apparatus 10 in contact with the aqueous solution are less than 5 volts. Eventually, the nitrate removal rate will equal its production rate and nitrate levels will be stable and extremely low.

Figure 6:
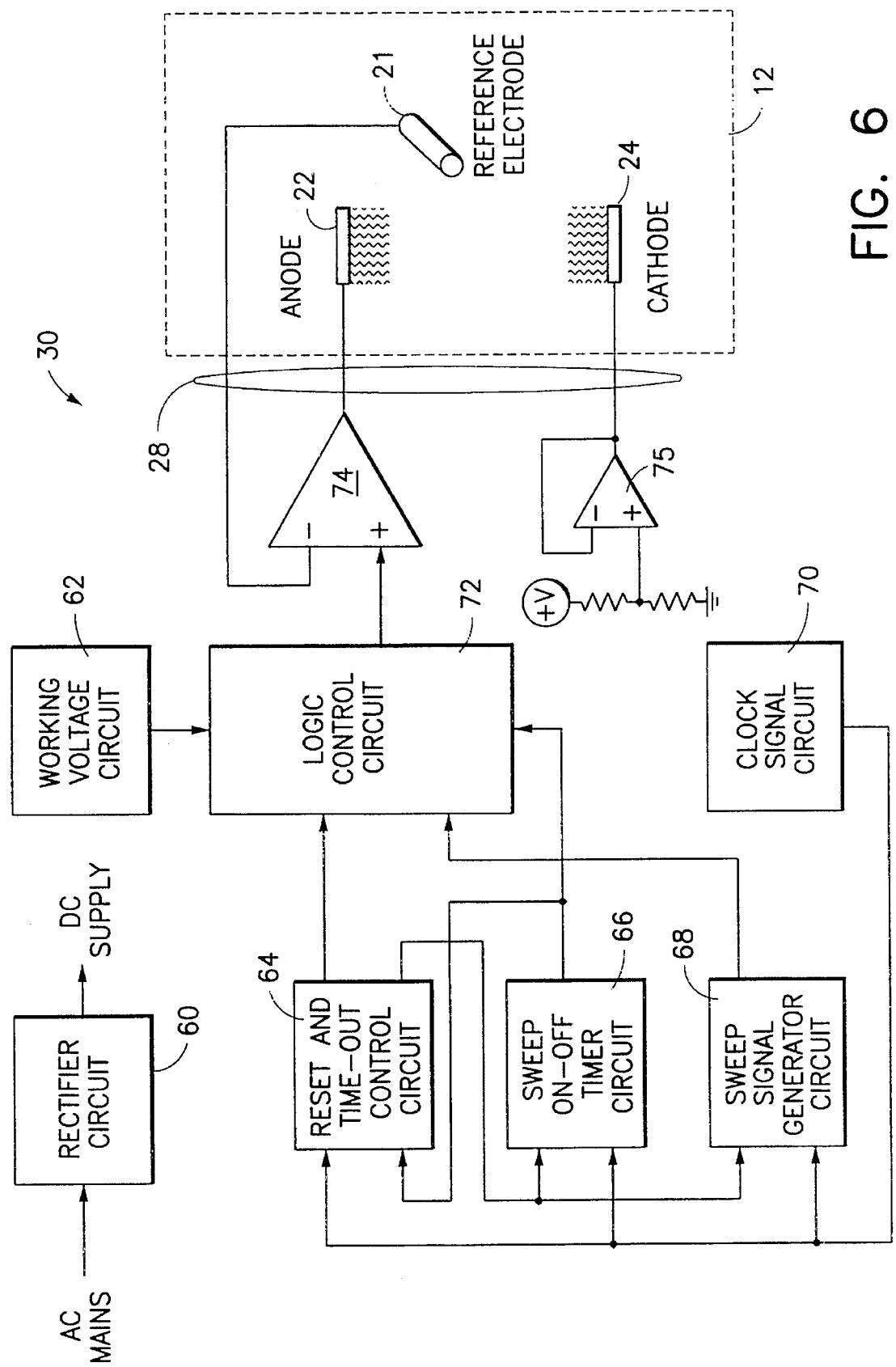
FIG. 6 is a schematic block diagram of an exemplary embodiment of an electrical circuit for powering the electrodes according to the invention.

Turning now to FIG. 6, an exemplary control circuit 30 generally includes a rectifier circuit 60 which is coupled to AC mains and provides a low DC voltage to the other components of the control circuit 30. Separate functional blocks are shown in FIG. 6 for a working voltage circuit 62, a reset and time-out control circuit 64, a sweep on-off timer circuit 66, and a sweep signal generator circuit 68. Each of the circuits 64, 66, and 68 receives a time base signal from a clock signal circuit 70 and provides an output to a logic control circuit 72 which also receives an input from the working voltage circuit 62. The logic control circuit 72 provides an output voltage to the positive input of an amplifier 74 which provides a positive voltage to the anode 22 via the three conductor cable 28. The reference electrode 21 is electrically coupled to the negative input of the amplifier 74 via the three conductor cable 28, and the cathode 24 is coupled via the three conductor cable 28 to an amplifier 75 such that its potential bias is maintained.

Figure 7:
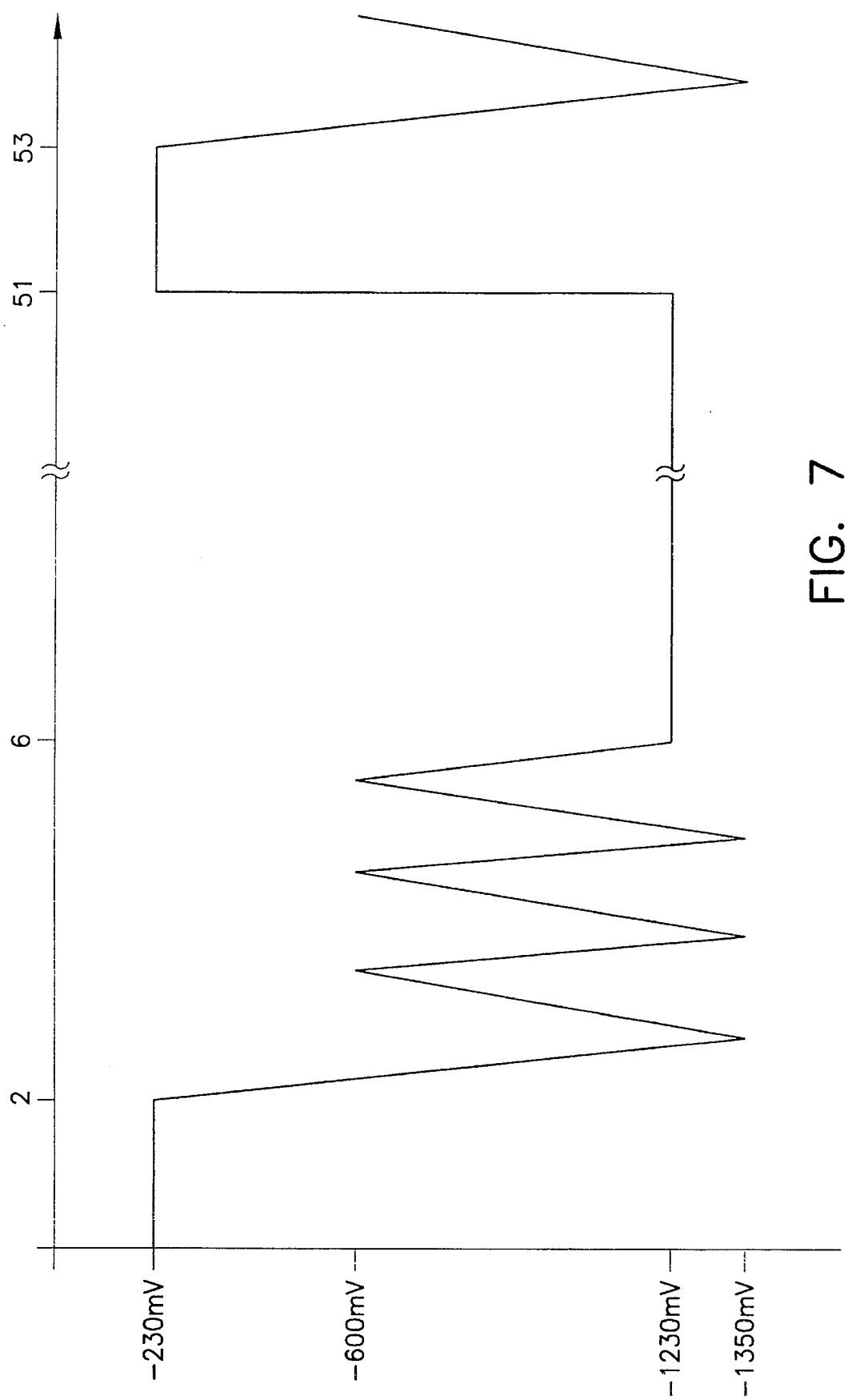
FIG. 7 is a plot of voltage against time illustrating the presently preferred voltage pattern applied to the electrodes according to the invention.

As mentioned above, when the circuit 30 is energized, the voltage applied to the electrodes is varied over time. In the preferred exemplary embodiment, the working voltage is in the range of −1,000 mV to −1,300 mV versus reference electrode 21 for a period of time in the range of approximately 5 to 45 minutes. The time-out period voltage is preferably in the range of −100 mV to −300 mV versus reference electrode 21 for a period of time in the range of approximately 1 to 20 minutes. A low end of the sweep voltage is preferably in the range of −400 mV to −700 mV versus reference electrode 21, and a high end of the sweep voltage is preferably in the range of −1,000 mV to −1,400 mV versus reference electrode 21. The sweep voltage cycle preferably lasts for a time period in the range of approximately 1 to 24 minutes. FIG. 7 shows an example of the output of the circuit 30. As shown in FIG. 7, a time-out voltage of approximately −230 mV is applied for approximately two minutes and is followed by a triangular wave sweep voltage having a low end of approximately −600 mV and a high end of approximately −1350 mV. The sweep voltage is applied for approximately four minutes and is followed by a constant working voltage of approximately −1230 mV. The working voltage is applied for approximately forty-five minutes after which the cycle begins again.

In general, the effectiveness of nitrate reducing apparatus 10 depends on the flow rate of the aqueous solution, the volume of the aqueous system, the standing nitrate and biomass concentration in the aqueous system, and the rate of ongoing nitrate loading (i.e. adding food and fish to a marine system) to the aqueous system.

From the foregoing description those skilled in the art will appreciate that all of the objects of the present invention are realized. An apparatus for removing nitrates from water has been shown and described which reduces the toxicity of marine and other aqueous systems to living organisms without the use of corrosive metals and without the generation of other poisonous substances.

While an exemplary embodiment has been shown and described, many variations are possible. The device can be manufactured in different sizes depending on the application, i.e. a home aquarium versus a commercial/industrial water treatment facility. Other applications include various salt water and fresh water environments, swimming pools and environmental applications, such as water purification, environmental cleanup and waste water management. FIGS. 8–12 show several variations of the apparatus according to the invention suitable for several different applications. Those skilled in the art will appreciate that the dimensions given above provide for a system with a relatively gentle rate of nitrate reduction suitable for relatively small aquaria and that in other applications, the size of the electrodes may be increased in order to provide for more rapid nitrate reduction.

Figure 8:
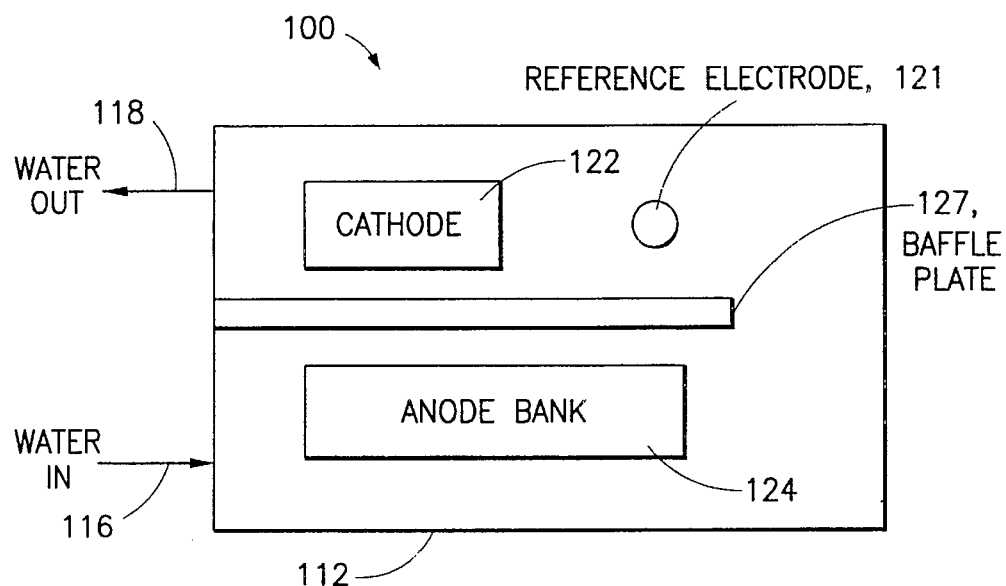
FIG. 8 is a schematic plan view of a second embodiment of the invention.

Turning now to FIG. 8, a nitrate reduction apparatus 100 includes a tank 112 having an inlet 116 and an outlet 118. A baffle plate 127 is placed between the inlet and the outlet and an anode bank 124 is placed on the inlet side of the baffle plate. A cathode 122 and reference electrode 121 are placed on the outlet side of the baffle plate 127. It will be appreciated that the relative positions of the cathode and reference electrode shown in FIG. 8 may be reversed and that the direction of water flow may be reversed. The baffle directs the flow of water over the electrodes to provide a more efficient nitrate removal.

Figure 9:
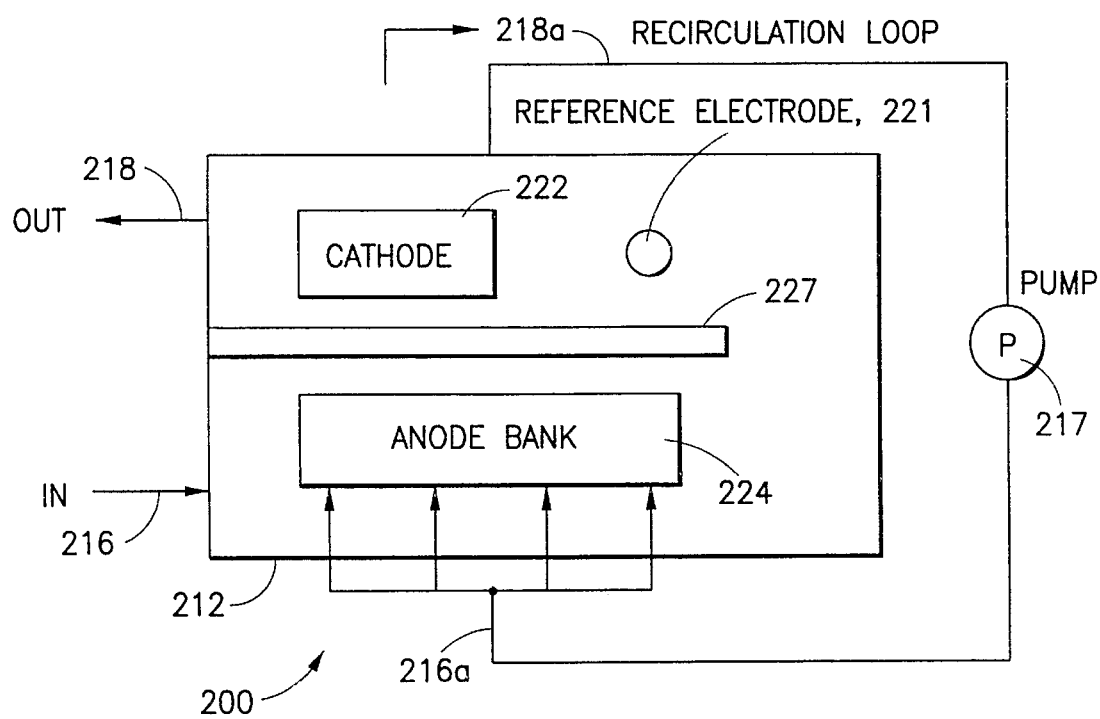
FIG. 9 is a schematic plan view of a third embodiment of the invention.

FIG. 9 shows an apparatus 200 which is similar to the apparatus 100 shown in FIG. 8 and where similar reference numerals refer to similar features. The apparatus 200 includes an additional inlet 216a and an additional outlet 218a which are coupled to each other by a recirculating conduit and pump 217. The recirculation of water inside the tank 212 improves the efficiency of nitrate removal and allows for faster effective throughput through the system via the inlet 216 and the outlet 218.

Figure 10:
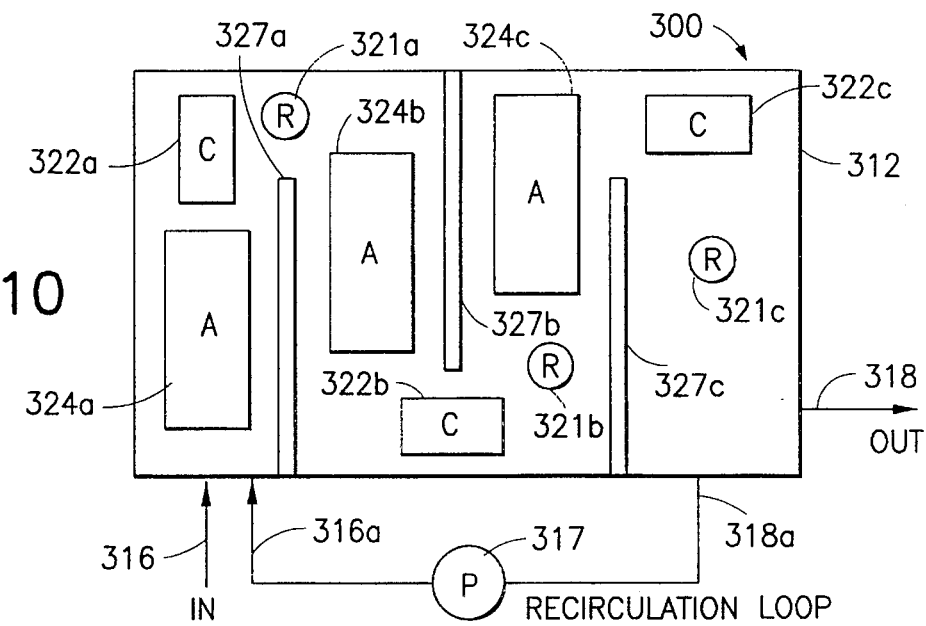
FIG. 10 is a schematic plan view of a fourth embodiment of the invention.

FIG. 10 shows a very high volume embodiment which builds on the features of embodiments 100 and 200. The apparatus 300 shown in FIG. 10 includes a tank 312 having an inlet 316 and an outlet 318. A plurality of baffle plates 327a–c are arranged in a labyrinth between the inlet and outlet. A corresponding plurality of anode banks 324a–c, cathodes 322a–c, and reference electrodes 321a–c are arranged between the baffle plates. In addition, a recirculating outlet 318a and a recirculating inlet 316a are coupled to each other by a fluid conduit and a recirculating pump 317. It will be appreciated that the baffle arrangement and the electrode arrangement are such that water entering the inlet 316 is subjected to several reactions as it passes through the labyrinth to the outlet 318. In addition, water is recirculated from the outlet to the inlet for further processing. This type of arrangement can be scaled to process water at the rate of one thousand gallons per minute or more, i.e. over one million gallons per day.

Figure 11:
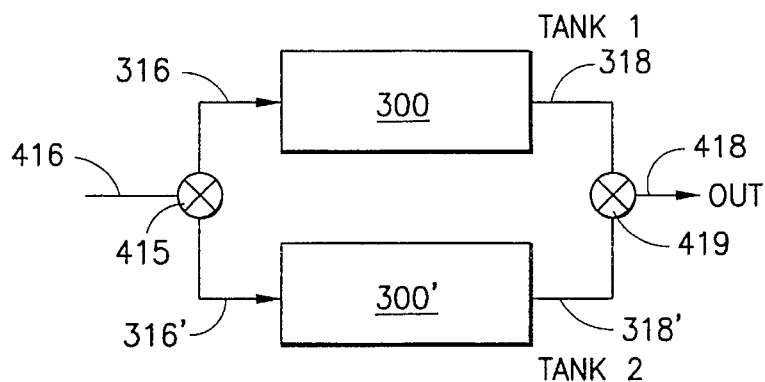
FIG. 11 is a schematic plan view of a fifth embodiment of the invention.

FIG. 11 shows still another high volume apparatus 400 according to the invention. The apparatus 400 actually includes two of the apparatus 300, 300' described above with the inlets 316, 316' coupled through a two-way valve 415 to the inlet 416 of the apparatus 400 and the outlets 318, 318' coupled through a two-way valve 419 to the outlet 418 of the apparatus 400. In use, the valves 415, 419 are set so that the first tank 300 is filled, then switched so that the second tank 300' is filled. By the time the second tank 300' is filled, the processing of the water in the tank 300 is substantially complete and the valves are switched again. The valves may be operated automatically based on time and water flow rate. The apparatus 400 can produce a processing throughput double that of the apparatus 300.

As mentioned above, the electrical requirements of the apparatus of the invention are modest and the apparatus is therefore energy efficient and may be run continuously. In the exemplary embodiment described above with reference to FIGS. 1–5, a system processing about 400 gallons per hour will consume approximately 1 to 10 watts. In the larger systems which process water at rates of 1,000 gallons per minute or more, power consumption is on the order of 25 to 100 Kilowatts.

Figure 12:
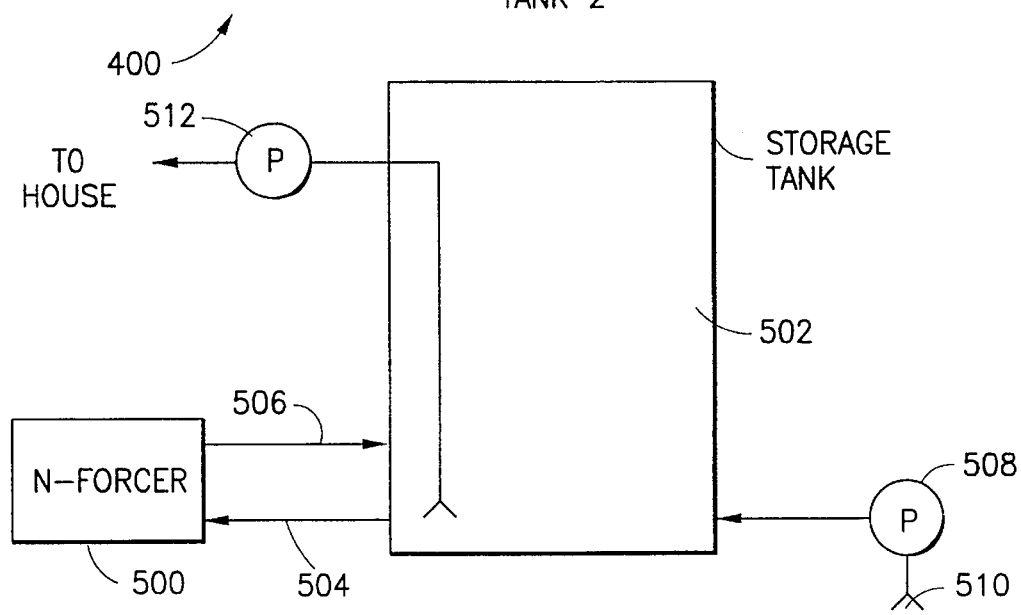
FIG. 12 is a schematic side elevation view of an application of the invention coupled to a well water holding tank for the reduction of nitrates in home drinking water.

While the invention has thus far been described with reference to aquatic systems and large industrial waste cleanups, the apparatus has a valuable application in home use where well water may be contaminated with nitrates. FIG. 12 shows how an apparatus 500 according to the invention can be coupled to a well water holding tank 502 via recirculation conduits 504, 506. In normal use, well water is drawn by a pump 508 from a well 510 and stored in a holding tank 502 until it is drawn out of the tank via interior plumbing 512 for household use. Typically, the water resides in the tank 502 for several hours before it is used in the home. While water is held in the tank 502, the apparatus 500 according to the invention treats the water to reduce nitrate concentration so that water supplied to the interior plumbing 512 is safe to drink.

There have been described and illustrated herein several embodiments of a method and apparatus for reducing nitrate concentration in water. While particular embodiments of the invention have been described, it is not intended that the invention be limited thereto, as it is intended that the invention be as broad in scope as the art will allow and that the specification be read likewise. Thus, while particular materials have been disclosed for constructing the flow cell or holding tank, it will be appreciated that other non-reactive, nonconductive materials could be utilized. Also, while particular dimensions have been shown with respect to the exemplary embodiment, it will be recognized that other dimensions would be used with similar results obtained in systems of different scale. Moreover, while particular configurations have been disclosed in reference to the electrical control circuit, it will be appreciated that other configurations providing similar functional signals could be used as well. Furthermore, while some embodiments have been disclosed as having a certain number of electrodes, it will be understood that different numbers of electrodes can achieve the same or similar function as disclosed herein depending on the scale of the system and the size of the electrodes.

It will therefore be appreciated by those skilled in the art that yet other modifications could be made to the provided invention without deviating from its spirit and scope as so claimed.

We claim:

1. An apparatus for reducing nitrates in an aqueous solution, comprising:

a) an electrochemical cell in which the aqueous solution containing nitrates is treated, said cell comprising a container;

b) an electrode system including a carbon fiber cathodic electrode, a carbon fiber anodic electrode, and a reference electrode, wherein all of said electrodes are immersed in the aqueous solution; and c) an electronic control circuit including a means for impressing a voltage across said electrodes causing electrochemical reduction/oxidation reactions on the surfaces of said cathodic and anodic electrodes, and means for controlling said electrodes at a potential wherein nitrates are reduced to gaseous products, and further wherein hydrogen, oxygen and chlorine are not produced.

2. An apparatus according to claim 1, wherein:

said cell is a flow cell through which the aqueous solution flows.

3. An apparatus according to claim 2, wherein:

said flow cell further comprises a lid and said electrodes are attached to said lid.

4. An apparatus according to claim 1, wherein:

said cell is molded of materials selected from the group consisting of polyvinyl chloride, acetylene butylene styrene, polymethyl methacrylate, and polycarbonate.

5. An apparatus according to claim 1, wherein:

said container includes a flange and an o-ring groove integral with said flange.

6. An apparatus according to claim 1, wherein:

said reference electrode is silver/silver chloride.

7. An apparatus according to claim 1, wherein:

the materials of which said cathodic and anodic electrodes are made are carbon fibers based on material selected from the group consisting of polyacrylonitrile, petroleum derivatives and phenolic resins.

8. An apparatus according to claim 7, wherein:

the surface area of said cathodic electrode is approximately 10 square feet.

9. An apparatus according to claim 7, wherein:

said cathodic and anodic electrodes are based on the same material.

10. An apparatus according to claim 9, wherein:

the anodic electrode to cathodic electrode surface area ratio is in the range of 40:1 to 120:1.

11. An apparatus according to claim 9, wherein:

the surfaces of said cathodic and anodic electrodes are chemically modified.

12. An apparatus according to claim 11, wherein:

the anodic electrode to cathodic electrode surface area ratio is approximately is in the range of 5:1 to 15:1.

13. An apparatus according to claim 9, wherein:

the surfaces of said cathodic and anodic electrodes are electrochemically modified.

14. An apparatus according to claim 13, wherein:

the anodic electrode to cathodic electrode surface area ratio is approximately is in the range of 5:1 to 15:1.

15. An apparatus according to claim 1, wherein:

said electronic control circuit further comprises means for sequentially providing three voltage signals between said reference electrode and said cathodic electrode, wherein each of said voltage signals are of different magnitudes, said voltage signals being a constant time-out period voltage, a sweep voltage and a constant working voltage.

16. A method of reducing nitrates in an aqueous solution, comprising the steps of:

a) providing an electrochemical cell including a container for at least partially containing the solution;

b) providing an electrode system including a carbon fiber cathodic electrode, a carbon fiber anodic electrode, and a reference electrode;

c) arranging all of the electrodes in the container such that they can be submersed in the solution when the solution is introduced into the container;

d) introducing the solution into the cell such that all of the electrodes are immersed in the aqueous solution;

e) providing an electronic control circuit operably connected to the electrodes which controls the potential at the electrodes; and f) impressing a voltage across the electrodes, the voltage causing an electrochemical reduction/oxidation reaction on the surfaces of the cathodic and anodic electrodes, wherein nitrates are reduced to gaseous products at the cathodic electrode and wherein hydrogen, oxygen and chlorine are not produced.

17. A method according to claim 16, wherein:

said step of providing a cell comprises providing a flow cell, and said step of introducing comprises pumping the solution through the flow cell.

18. A method according to claim 17, wherein:

the flow rate of the aqueous solution through said flow cell is in the range of 50 to 250 gallons per hour.

19. A method according to claim 16, wherein:

said step of impressing comprises sequentially impressing three voltage signals between the reference electrode and the cathodic electrode, wherein each of the voltage signals are of different magnitudes, the voltage signals being a constant timeout period voltage, a sweep voltage and a constant working voltage.

20. A method according to claim 19, wherein:

said time-out period voltage is in the range of $-100$ mV to $-300$ mV versus said reference electrode.

21. A method according to claim 19, wherein:

a low end of said sweep voltage is in the range of $-400$ mV to $-700$ mV versus said reference electrode and a high end of said sweep voltage is in the range of $-1,000$ mV to $-1,400$ mV versus said reference electrode.

22. A method according to claim 19, wherein:

said working voltage is in the range of $-1,000$ mV to $-1,300$ mV versus said reference electrode.

23. A method according to claim 19, wherein:

no nitrate reduction occurs during the period of said time-out period voltage.

\* \* \* \* \*